Patented Mar. 23, 1948

2,438,480

UNITED STATES PATENT OFFICE 2,438,480

PURIFICATION OF VINYL HALIDE AND VINYLIDENE HALIDE POLYMERS

George W. Stanton, Midland, Mich., assignor to The Dow Chemical Company, Midland, Mich., a corporation of Delaware No Drawing. Application April 5, 1944, Serial No. 529,695

1 Claim. (Cl. 260—88)

This invention relates to a process for the purification of alcohol-insoluble resinous or polymeric substances prepared by the catalytic polymerization of vinylidene halides or vinyl halides, e. g. the chlorides, bromides, or chlorobromides, either alone or admixed with materials copolymerizable therewith.

In the preparation of alcohol-insoluble polymers and copolymers derived from vinylidene halides and/or vinyl halides, it has been the practice to increase the rate of reaction by adding to the monomeric materials one or a mixture of polymerization catalysts. Among the catalysts which have been so employed are the organic and inorganic per-oxygen compounds, such as benzoyl peroxide, acetyl peroxide, acetyl benzoyl peroxide, lauryl peroxide, perbenzoic acid, peracetic acid, hydrogen peroxide, magnesium peroxide, barium peroxide, sodium or potassium perborate, sodium or potassium persulfate, etc. all of which have a peroxide type of linkage (—O—O—) in the molecule. Of these several catalysts, the organic peroxides, particularly benzoyl peroxide, are probably the most widely used commercially, since they have a number of advantages not possessed by any of the other catalysts mentioned. The per-oxygen compounds, however, have the disadvantage as catalysts that after the polymerization the solid or semi-solid resinous or polymeric reaction product obtained contains traces of catalyst residue, intimately bound therein. Such residue may be either the original catalytic compound in unchanged form or a reaction product thereof having certain properties of the per-oxygen compounds such as the ability to react with potassium iodide to liberate elemental iodine. Although the exact chemical nature of such catalyst residues is not accurately known, they are thought to be peroxides and are herein denoted as "peroxide-containing catalyst residues." Peroxide-containing catalyst residues are present in the polymeric substance when either inorganic or organic per-oxygen compounds are used as catalysts. When polymers containing such peroxide-containing catalyst residues are freed in the usual ways from any unpolymerized monomeric material and are subjected to the elevated temperatures required in molding or other hot-working operations, they usually undergo a decided color change, which is apparently the result of a partial thermal decomposition, and much of which has been found to be due to the presence in the polymeric substance of the traces of peroxide-containing catalyst residue. The presence in the polymeric substance of more than traces of peroxide-containing catalyst residues is particularly undesirable for this reason. No simple and inexpensive method of removing such peroxide-containing catalyst residues from the polymeric substances with which the invention is concerned has been described. They are decomposed only slowly, and with accompanying discoloration of the polymeric substance, upon heating, and, although they may be extracted from the polymeric substances with certain organic solvents, such extraction is slow and expensive and with most solvents considerable undesirable swelling of the polymeric substance occurs.

It is, accordingly, among the objects of the present invention to provide a method whereby peroxide-containing catalyst residues may be removed substantially completely from alcohol-insoluble resinous or polymeric products derived from vinylidene halides or from vinyl halides. Another object is to provide a process whereby there is obtained an alcohol-insoluble resinous or polymeric vinylidene halide or vinyl halide product which can be heated to a hot-working temperature without substantial decomposition or discoloration.

It has now been found that the foregoing objects may be accomplished readily by treating the resinous or polymeric products derived from vinylidene halides or from vinyl halides with a lower aliphatic monohydric alcohol at a temperature above about 100° C. By this treatment the peroxide-containing catalyst residues are converted into substances, which do not give positive tests for peroxides and which do not cause the polymer or resin to darken in color when it is molded or otherwise hot-worked under heat and pressure. The process of the invention is not a simple extraction of the peroxide-containing catalyst residue from the polymer or resin with the alcohol, after the manner of the process described in U. S. Patent 2,277,504, because not only is the polymer or resin free from peroxide-containing residues after the treatment, but the alcohol contains no dissolved substance giving a positive test for peroxides after it is separated from the polymer or resin. Comparative determinations have shown that whereas a relatively small amount of alcohol suffices in a short time to destroy or remove peroxide-containing residues from the polymer or resin in accordance with the herein-described invention, much larger quantities and repeated extractions are required when it is attempted merely to dissolve the peroxide-containing residues from the resin with an alcohol at a lower temperature. This is illustrated clearly in Example 2. The effectiveness of the process of the invention is the more surprising in view of the fact that when the polymer or resin is treated under similar conditions with water or a hydrocarbon instead of with an alcohol little or no reduction in the peroxide content is effected.

In a preferred embodiment of the invention, a substance, selected from the class consisting of the alcohol-insoluble vinyl halide-containing polymers and the alcohol-insoluble vinylidene halide-containing polymers, is treated in finely-divided form with sufficient alcohol, usually with from about one-half to about two times or more of the weight of the polymer, to moisten or wet the powder, and the mixture is then heated at from about 100° to about 140° C., or higher, for a period of from about 0.5 to about 30 minutes or longer. Heating at a temperature sufficiently high to decompose or discolor the polymeric substance is avoided. The mixture is then cooled and the alcohol removed, e. g. by filtration and subsequent washing or drying, after which the recovered polymer may be dried and molded or hot-worked in any of the usual ways with the formation of substantially undiscolored articles. In case traces of monomeric or alcohol-soluble low molecular weight polymeric substances are present, these will, if they are alcohol-soluble, dissolve in the alcohol under the conditions of the treatment, and an effective separation thereof from the alcohol-insoluble polymer may be effected by washing the treated insoluble polymer with sufficient fresh alcohol or other suitable solvent to wash out the dissolved monomer or low molecular weight polymer.

The invention is applied with particular ease to polymeric substances obtained as the result of a polymerization carried out in aqueous emulsion or suspension. Such substances are ordinarily obtained directly from the polymerization step in the form of a fine powder or small granules which need not be further ground before being treated with alcohol to destroy the peroxide-containing catalyst residues. Polymeric substances obtained in other forms may, of course, be treated by the method of the invention after being ground or otherwise subdivided so as to permit easy access of the alcohol to all portions of the substance. In the case of water-wet polymeric substances, it is not necessary to dry the substance to remove the water before treating it with alcohol since the presence of a considerable proportion of water does not interfere with the effectiveness of the alcohol in destroying the peroxide-containing catalyst residues. It is unnecessary to use anhydrous alcohol to treat the polymeric substance. In the case of alcohols of limited water-solubility, such as butanol or pentanol, the presence of water in a proportion sufficient to create two liquid phases in the mixture does not interfere with the effectiveness of the process. Little or no swelling of the polymer is caused by the alcohol.

Alcohols which may be used in the process include the lower aliphatic monohydric alcohols, or alkanols, containing from one to eight carbon atoms in the molecule. Alcohols boiling above 100° C., e. g. butanol, pentanol, and hexanol, are preferred because the treatment may then be carried out at atmospheric pressure, although alcohols boiling below 100° C., such as methanol, are equally effective when the treatment is carried out under sufficient pressure to permit the specified temperature to prevail within the treating vessel.

Although the process of the invention may be applied to a polymer or copolymer selected from the class described so as to effect substantially complete removal of peroxide-containing catalyst residues therefrom, it should be noted that the invention is not limited to such complete removal of such substances, but includes, as well, instances wherein it may be desirable for certain reasons to effect not more than a substantial reduction in the content of peroxide-containing catalyst residue in the polymeric substance. It has been observed that the degree of color which develops during the hot-working of the polymeric substances with which the invention is concerned is roughly proportional to the percentage content of peroxide-containing catalyst residues in the substance and that any reduction in such residue content effects a corresponding reduction in the color of the hot-worked substance. Consequently, when a product completely free of peroxide-containing catalyst residues is not desirable or necessary, the process may be modified within the above specified limits as to conditions of temperature and time, or otherwise, so as to effect the desired reduction of peroxide-containing catalyst residue content without effecting its complete removal.

It is, of course, understood further that the treatment of the invention may be combined with other treatments of the polymer to remove other substances which may be present and which may interfere with the subsequent hot-working of the polymer. Thus, the powdered polymer may be first washed with aqueous acid to remove metal salts and then treated with alcohol in accordance with the present invention.

The following examples illustrate the practice of the invention:

Example 1

A polyvinyl chloride was prepared by agitating and heating together, at from 34° to 38° C. for 84¼ hours, 230 parts by weight of vinyl chloride, 800 parts of water, 1.25 parts of benzoyl peroxide, and 0.75 part of methyl cellulose as a dispersing agent. The resulting polyvinyl chloride was filtered and dried. It was 0.85 per cent soluble in acetone and contained 0.55 per cent by weight of peroxide-containing catalyst residues calculated as benzoyl peroxide.

20 parts by weight of the dry polyvinyl chloride and 40 parts of a commercial mixture of amyl alcohols were heated at the boiling point of the alcohol mixture (vapor temperature about 136° C.) for about one minute. After cooling somewhat the polymer was filtered and dried. The dried powder gave a negative test for peroxides when mixed with an aqueous-acetone solution of potassium iodide.

60 parts by weight of the polyvinyl chloride which had been boiled with amyl alcohol as just described and 40 parts of tricresyl phosphate were blended by stirring the materials together at a temperature of about 100° C. for 10 minutes. The plasticized composition thus prepared was then molded for 5 minutes at 150° C. under moderate pressure to form a test specimen. The molding was colorless. Similar moldings prepared in the same manner by plasticizing and molding the polyvinyl chloride which had not been boiled with pentanol had a deep wine color.

Example 2

30 parts by weight of polyvinyl chloride (prepared as in Example 1) was wet with 60 parts of methanol and heated rapidly in a closed vessel to 138° C. The pressure in the vessel increased during the heating to about 134 pounds per square inch. The vessel was immediately cooled, opened, and the contents filtered and tested for peroxide-containing catalyst residues. No trace of peroxide-containing catalyst residue was present either in the alcoholic filtrate or in the solid polymer. The polymer was dried and again tested with negative results. Samples of both the treated and untreated polyvinyl chloride were molded at 170° C. for about 30 seconds. The molding from the untreated polymer was dark brown in color, whereas that from the polymer which had been treated with methanol under pressure was clear and colorless.

10 parts by weight of polyvinyl chloride (prepared as in Example 1) was mixed with 80 parts of methanol and refluxed at atmospheric pressure (vapor temperature about 64.5° C.) for three hours and the mixture cooled. The polymer was filtered from the solution and dried. Both the alcoholic filtrate and the dried polymer gave very strong positive tests for peroxides.

*Example 3*

A copolymer of vinylidene chloride and vinyl chloride was prepared by agitating and heating together, at 50° C. for 65¾ hours, 85 parts by weight of vinyl chloride, 15 parts of vinylidene chloride, 200 parts of water, 0.5 part of benzoyl peroxide, and 0.5 part of methyl cellulose. The polymer as recovered from the mixture by filtering and drying contained 0.0998 per cent peroxide-containing catalyst residue calculated as benzoyl peroxide.

20 parts by weight of the above copolymer of vinylidene chloride and vinyl chloride was heated with 20 parts of amyl alcohol at 115° C. for 4 minutes. Upon cooling and filtering, the copolymer gave a negative test for peroxides.

*Example 4*

A copolymer of vinylidene chloride and vinyl chloride was prepared by agitating and heating together, for 120½ hours at 50° C., 116 parts by weight of vinylidene chloride, 18.75 parts of vinyl chloride, 250 parts of water, and 0.125 part of benzoyl peroxide. The copolymer, when recovered from the mixture by filtering, washing, and drying, contained 0.091 per cent peroxide-containing catalyst residue, calculated as benzoyl peroxide.

50 parts by weight of the copolymer and 150 parts of normal butanol were heated together at 100° C. for 30 minutes. Upon recovering the copolymer from the mixture, it was found to contain 0.0023 per cent peroxide-containing catalyst residue calculated as benzoyl peroxide.

*Example 5*

Twenty parts by weight of a copolymer of vinylidene chloride with vinyl chloride, prepared according to the method of Example 4, which had been washed with water but not dried and which contained about 20 to 25 per cent of water, was heated at 130° to 140° C. for about one minute with 40 parts of commercial isoamyl alcohol, cooled, filtered and tested for peroxide-containing catalyst residue. No evidence of peroxides was found either in the alcoholic filtrate or in the treated polymer.

*Example 6*

A copolymer of vinylidene chloride and ethyl acrylate was prepared by agitating vigorously, at a temperature of 45° C. for 8 hours, a suspension in water of 95 parts by weight of vinylidene chloride and 5 parts of ethyl acrylate. 1.5 parts of potassium persulfate was used as a catalyst. The mixture was irradiated throughout the entire time with ultraviolet light. The mixture was filtered and the copolymer washed thoroughly with water, and dried. The dried powder gave a very strong positive reaction when tested for peroxide-containing catalyst residue. A sample of the copolymer was heated with boiling isoamyl alcohol (vapor temperature about 130° C.) for 4 minutes. Upon cooling and filtering the mixture, the recovered powder was found to be free of peroxides.

*Example 7*

A vinyl chloride polymer was prepared in water suspension at 30° C. using 2 per cent, based on the weight of the monomeric vinyl chloride, of 100 volume hydrogen peroxide as a catalyst. The washed and dried finely-divided polymer gave a strong positive reaction when tested for peroxides. A sample of the polymer was heated in boiling isoamyl alcohol for 2 minutes and was then found to be free of peroxide.

*Example 8*

A mixture of 95 parts by weight of vinylidene chloride, 5 parts of ethyl acrylate, and 0.2 part of caprylyl peroxide was suspended in water and agitated vigorously at 60° C. for 58 hours. The mixture was filtered and the copolymer washed thoroughly and dried. A strong positive reaction was obtained when the copolymer was tested for peroxides. After treatment with boiling isoamyl alcohol for 3 minutes, the copolymer was found to be free of peroxides.

*Example 9*

A portion of the polyvinyl chloride, prepared in Example 1, was heated with boiling isoamyl alcohol (130° C.) for 7 minutes, after which it was found to be free of peroxides. A duplicate sample of the same co-polymer was heated at 130° C. in a petroleum hydrocarbon fraction having a boiling range of 150° to 205° C. After 3 hours of heating, a strong positive reaction was obtained when the polymer was filtered from the hydrocarbon and tested for peroxides. The polymer was noticeably discolored at the end of the 3 hours of heating.

Other modes of applying the principle of the invention may be employed instead of the one explained, change being made as regards the process herein disclosed, provided the step or steps stated by the following claim or the equivalent of such stated step or steps be employed.

I therefore particularly point out and distinctly claim as my invention:

The method for destroying peroxide-containing catalyst residues in an alcohol-insoluble polymer containing a member of the class of the vinyl halides and the vinylidene halides polymerized therein, which comprises heating the polymeric substance in finely divided solid form with sufficient of an amyl alcohol in the liquid phase to wet the polymer, at the boiling point of the alcohol, for a period sufficient to destroy the peroxide, and separating the so-purified finely divided solid polymer from the liquid alcohol, both the polymer and the alcohol giving negative tests for peroxides when tested with an aqueous acetone solution of potassium iodide.

GEORGE W. STANTON.

(References on following page)

REFERENCES CITED

The following references are of record in the file of this patent:

UNITED STATES PATENTS

| Number | Name | Date |
|---|---|---|
| 1,983,949 | Semon | Dec. 11, 1934 |
| 2,013,941 | Young et al. | Sept. 10, 1935 |
| 2,277,504 | Wiley | Mar. 24, 1942 |
| 2,337,424 | Stoner et al. | Dec. 21, 1943 |
| 2,343,997 | Powell et al. | Mar. 14, 1944 |
| 2,380,009 | Arnold et al. | July 10, 1945 |

FOREIGN PATENTS

| Number | Country | Date |
|---|---|---|
| 525,048 | Great Britain | Aug. 20, 1940 |